US 6,725,393 B1

United States Patent
Pellegrino et al.

(10) Patent No.: US 6,725,393 B1
(45) Date of Patent: Apr. 20, 2004

(54) SYSTEM, MACHINE, AND METHOD FOR MAINTENANCE OF MIRRORED DATASETS THROUGH SURROGATE WRITES DURING STORAGE-AREA NETWORK TRANSIENTS

(75) Inventors: Greg Pellegrino, Tomball, TX (US); Thomas Grieff, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 585 days.

(21) Appl. No.: 09/707,132

(22) Filed: Nov. 6, 2000

(51) Int. Cl.[7] .................................................. G06F 11/00
(52) U.S. Cl. .......................................... 714/6; 709/239
(58) Field of Search ............................ 714/4, 6, 43, 56; 709/239; 370/225

(56) References Cited

U.S. PATENT DOCUMENTS

| | | | | | |
|---|---|---|---|---|---|
| 5,155,845 A | * | 10/1992 | Beal et al. | ...................... | 714/6 |
| 5,216,619 A | * | 6/1993 | Dunbar et al. | ................. | 700/99 |
| 5,544,347 A | * | 8/1996 | Yanai et al. | ................ | 711/162 |
| 5,633,999 A | * | 5/1997 | Clowes et al. | .................. | 714/6 |
| 5,668,943 A | * | 9/1997 | Attanasio et al. | ............... | 714/7 |
| 6,073,209 A | * | 6/2000 | Bergsten | ...................... | 711/114 |
| 6,101,508 A | * | 8/2000 | Wolff | .......................... | 709/223 |
| 6,128,750 A | * | 10/2000 | Espy et al. | ..................... | 714/7 |
| 6,389,432 B1 | * | 5/2002 | Pothapragada et al. | ...... | 707/205 |
| 6,397,356 B1 | * | 5/2002 | Yonezawa | ..................... | 714/43 |
| 6,400,730 B1 | * | 6/2002 | Latif et al. | ................... | 370/466 |
| 6,421,711 B1 | * | 7/2002 | Blumenau et al. | .......... | 709/213 |
| 6,535,518 B1 | * | 3/2003 | Hu et al. | ..................... | 370/401 |
| 6,564,336 B1 | * | 5/2003 | Majkowski | ..................... | 714/4 |
| 6,643,795 B1 | * | 11/2003 | Sicola et al. | ................... | 714/6 |
| 6,654,769 B2 | * | 11/2003 | Ito et al. | ...................... | 707/200 |
| 6,658,478 B1 | * | 12/2003 | Singhal et al. | .............. | 709/232 |

* cited by examiner

Primary Examiner—Robert Beausoliel
Assistant Examiner—Gabriel Chu

(57) ABSTRACT

A host bus adapter for interconnecting a computer system to a storage area network has an embedded processor for processing frames. When frames are received by the processor, it inspects frames for encapsulated write requests and, if encapsulated write request frames are found, de-encapsulates the write request and forwards the write request to a target node of the write request.

15 Claims, 5 Drawing Sheets

EXAMPLE SAN
CONFIGURATION

SYSTEM, MACHINE, AND METHOD FOR MAINTENANCE OF MIRRORED DATASETS THROUGH SURROGATE WRITES DURING STORAGE-AREA NETWORK TRANSIENTS

FIELD OF THE INVENTION

The invention relates to the field of high-reliability computing on storage area networks. In particular the inventions relates to systems and methods of maintaining mirrored datasets when a storage area network suffers sufficient disruption that a particular copy of a mirrored dataset can not be seen for direct writes by one, but not all, compute nodes of the network.

BACKGROUND OF THE INVENTION

In the field of high-reliability computing, it is often desirable to maintain redundant data. Redundant data can provide some protection against failure of a storage device. For example, a RAID (Redundant Array of Independent Disks) system can often be configured to keep full duplicate copies of data on separate disk drives. Should a failure occur that affects one, but not both, of these duplicate, or "mirrored" datasets, data will not be lost. Continued operation may also be possible using the surviving dataset. Other configurations are known, for example, in RAID-5 operation data and parity-recovery information may be striped across a number of drives, failure of any one drive will not result in data loss.

Mirrored datasets are not limited to duplicate datasets maintained by RAID systems. For example, it may be desirable to maintain a primary copy of a mirrored dataset at a different geographical location than the secondary copy. Such remotely located mirrored datasets can provide protection against data loss in the event of flood, fire, lightning strike, or other disaster involving the location of one copy of the dataset.

A mirrored dataset ideally has at least two copies of all information written to the dataset. Whenever a write occurs, that write must be made to both copies for full redundancy to be maintained. If only one copy is written then redundancy protection is lost until repairs can be made and the datasets synchronized. Synchronization of datasets can be a time consuming task; it is desirable that need for synchronization be minimized. On the other hand, reading of data from a mirrored dataset can occur from any copy if the dataset is synchronized, or if the data read is known not to have been altered since the last synchronization of the data.

Storage Area Networks (SANs) are characterized as high-speed networks primarily conveying data between storage nodes and compute nodes, often utilizing separate network hardware from that used for general-purpose network functions. Storage nodes are machines that primarily serve storage to other nodes of the network, while compute nodes are typically computers that use storage provided by storage nodes. Compute nodes may, and often do, have additional storage devices directly attached to them.

SANs are often implemented with fibre-channel hardware, which may be of the arbitrated loop or switched-fabric type. Storage area networks may be operated in a "clustering" environment, where multiple compute nodes have access to at least some common data, the common data may in turn be stored with redundancy. SANs having multiple processors accessing a common database stored with redundancy, are often used for transaction processing systems.

SANs are also known that use non-fibre-channel interconnect hardware.

Most modern computer networks, including fibre-channel storage area networks, are packet oriented. In these networks, data transmitted between machines is divided into chunks of size no greater than a predetermined maximum. Each chunk is packaged with a header and a trailer into a packet for transmission. In Fibre-Channel networks, packets are known as Frames.

A network interface for connection of a machine, to a Fibre Channel fabric is known as an N_port, and a machine attached to a Fibre-Channel network is known as a node. Nodes may be computers, or may be storage devices such as RAID systems. An NL_port is an N-port that supports additional arbitration required so that it may be connected either to a Fibre Channel fabric or to a Fibre Channel Arbitrated Loop. An L_port is a network interface for connection of a machine to a Fibre Channel Arbitrated Loop. Typically, an N_port, NL_port, or L_Port originates or receives data frames. Each port incorporates such hardware and firmware as is required to transmit and receive frames on the network coupled to a processor and at least one memory system. Ports may incorporate a processor and memory of their own, those that don't utilize memory and processor of their node. Received frames are stored into memory, and transmitted frames are read from memory. Such ports generally do not re-address, switch, or reroute frames.

SANS often have redundant network interconnect. This may be provided to increase performance by providing high bandwidth between the multiple nodes of the network; to provide for operation despite some potential failures of network components such as hubs, switches, links, or ports; or both.

Description of the Problem

It is possible for some network interconnect components of a SAN to fail while other components continue to operate. This can disrupt some paths between nodes of the network.

There are possible network configurations where a first compute node of the SAN can lose its direct path to a first storage node; while the first compute node has a path to a second storage node of the network, and a second compute node still has a path to the first storage node. If data is mirrored on the primary and secondary storage nodes, the first processor has difficulty updating the copy on the primary storage node, although it can read data from the copy on the secondary node and update that copy.

When failures of this type occur, typical SAN-based systems are left with two alternatives: First, the first processor may be shut down, forcing the second processor to handle all load, but permitting maintenance of the mirrored data. This is undesirable because there may be significant loss of throughput with the first processor off-line. Second, the first storage node may be shut down, permitting the processors to share the load, but causing the mirrored datasets to lose synchronization. This is undesirable because synchronization of the datasets is required before the first storage node can be brought back on-line, and because there is a risk of data loss should the second storage node fail before synchronization is completed.

Solution to the Problem

A modified NL_Port (M_Port) has capability to automatically maintain a mirrored dataset on a pair of storage nodes. A second M_Port can perform a write operation to a copy of a mirrored dataset on behalf of a first M_Port should the second M_Port be able to communicate with the first M_port, and the first M_Port be unable to reach that copy of the mirrored dataset. This write by the second M_Port in behalf of the first M_Port is known herein as a surrogate write.

In a first embodiment, surrogate writes are performed by port hardware, without need to involve a node processor in the surrogate write.

In another embodiment of the invention, surrogate writes are performed by a SAN node, thereby enabling surrogate writes when surrogate write requests are received on a port other than that in communication with the target of the surrogate writes.

The invention is applicable to Storage Area Networks (SANs) in general, and is of particular utility for Web-page serving and transaction processing systems.

The foregoing and other features, utilities and advantages of the invention will be apparent from the following more particular description of a preferred embodiment of the invention as illustrated in the accompanying drawings.

DETAILED DESCRIPTION

Figure 1:
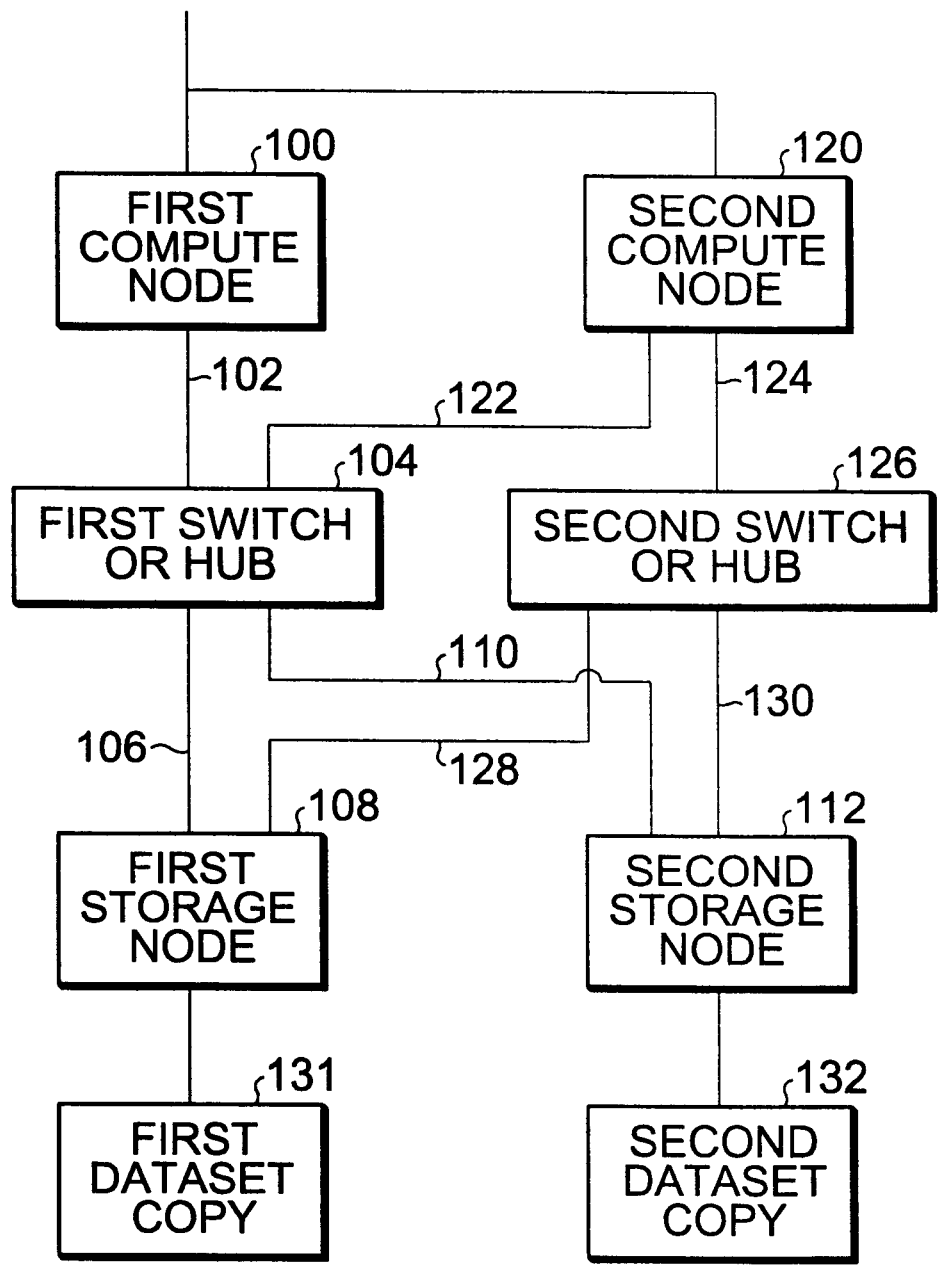
FIG. 1 is a diagram of a network that may benefit from the present invention.

A storage area network has a first compute node 100 that has a link 102 to a first switch or hub 104. The first switch or hub 104 also has a link 106 to a first storage node 108, and a link 110 to a second storage node 112. A path therefore exists from the first compute node 100 through the first switch 104 to each of the first storage node 108 and second storage node 112.

Similarly, the network has a second compute node 120 that has a link 122 to the first switch or hub 104 and a link 124 to a second switch or hub 126. The second switch or hub 126 also has a link 128 to the first storage node 108, and a link 130 to the second storage node 112. A path therefore exists from the second compute node 120 through the second switch 126 to each of the first storage node 108 and second storage node 112.

A dataset is mirrored, such that a first copy 131 of the dataset is maintained on the first storage node 108, and a second copy 132 maintained on the second storage node 112. This dataset is in use by the first compute node 100, and may also be in use by other nodes of the SAN.

At least one path exists through the network for communication between the first compute node 100 and the second compute node 120. In this example network, a path exists from first compute node 100, link 102, switch 104, link 172 to second compute node 120.

The particular network configuration of FIG. 1 is by way of example to illustrate the utility and operation of the invention and not by way of limitation. Many other network configurations are possible that may benefit from the invention. Some network configurations that may benefit from the invention may themselves result from failure or overload of network components.

When compute node 100 reads from the dataset, it may read from either the first dataset copy 131 or the second dataset copy 132. When compute node 100 writes to the dataset, it must write to both the first dataset copy 131 and the second dataset copy 132 if synchronization of the datasets is to be maintained.

Consider failure of link 106 between the first switch or hub 104 and the first storage node 108.

In this event, the path from first compute node 100 through switch 104 to first storage node 108 and the first dataset copy 131 will also fail. Since the path from first compute node 100 through switch 104 to second storage node 112 and the second dataset copy 132 is still operational, first compute node 100 can continue to read the dataset by reading the second copy 132. Since the path to the first dataset copy 131 has failed, compute node 100 can not ordinarily write to first dataset copy 131, which may result in loss of synchronization of the dataset copies.

In many SANs, the compute nodes, such as first compute node 100 and second compute node 120, are in, communication with each other. In the example of FIG. 1, first compute node 100 may communicate with second compute node 120 through first switch 104 by way of links 102 and 122. In the example network configuration, first compute node 100 may also communicate with second compute node 120 through network hardware separate from the SAN, such as an ethernet or other local area network 136.

With only link 106 failed, second compute node 120 still has a path through links 124 and 128, and switch 126, to the first storage node 108 and the first dataset copy 131.

In a network embodying the present invention, when first compute node 100 can not reach first storage node 108, second compute node 120 can reach first storage node 108, and first compute node 100 can reach second compute node 120; the second compute node 120 performs surrogate write operations in behalf of first compute node 100. This permits maintenance of synchronization between the first copy 131 and the second copy 132 of the dataset.

Surrogate read or write operations may also be performed to non-mirrored datasets, provided that a path exists from the compute node desiring the read or write to a compute node having a path to the destination device.

Each compute node maintains a list of paths to storage nodes. This list includes status of the paths. It is known that path status can change to failed should a problem occur with a link, switch, or other network device.

Figure 2:
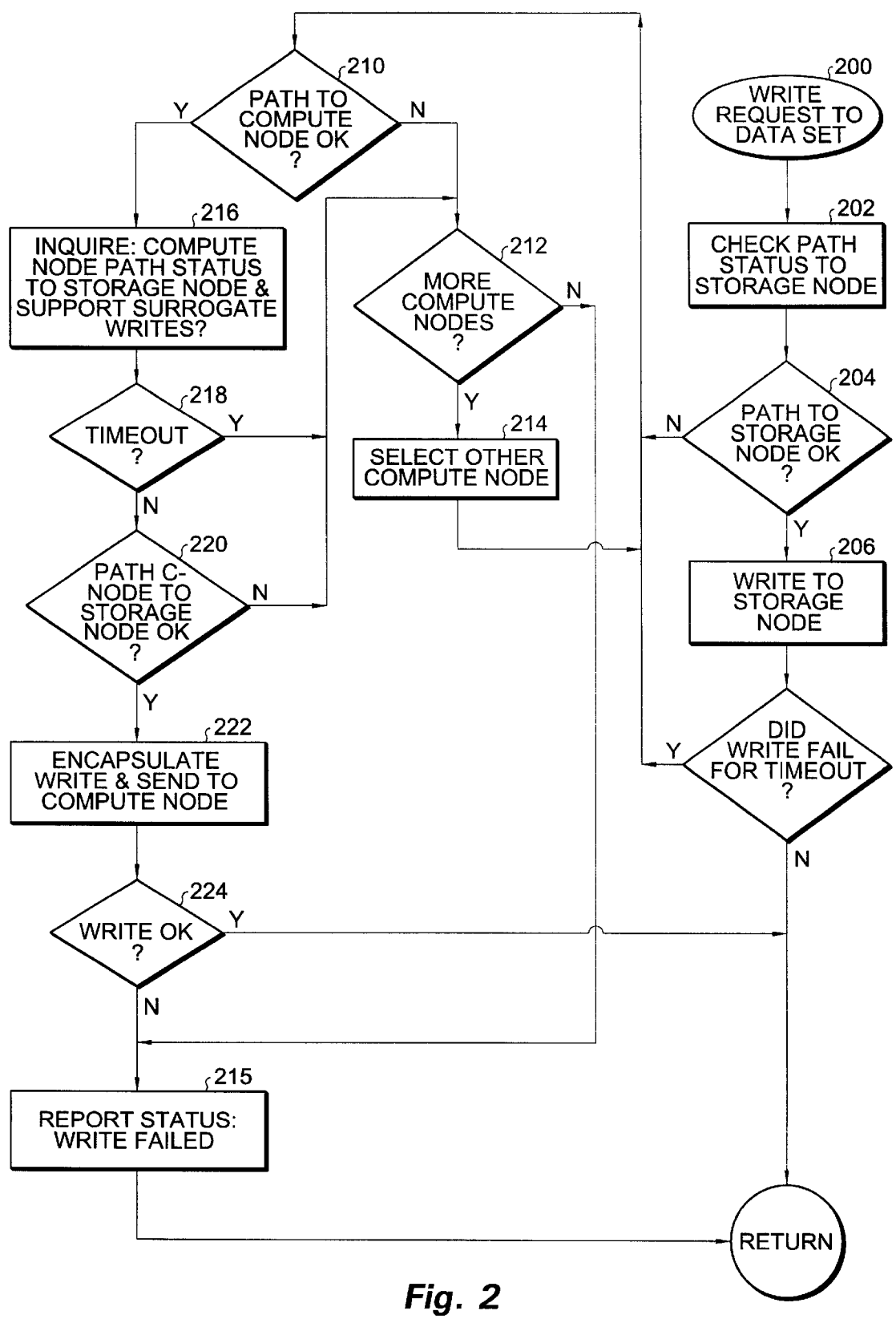
FIG. 2, a flowchart of surrogate writes to a non-mirrored dataset.

When surrogate writes are enabled and a compute node desires to write a dataset 200 (FIG. 2), that node checks 202 the path status to the storage node on which the dataset is stored. If that path has a status of "path OK" 204, a write is attempted 206 to the dataset on that node. If the write succeeds, all is well. If the write fails 208 for reasons that are likely to be a result of a failed path to the storage node, such as a fibre channel timeout error, the node looks for a path 210 to a second compute node, and verifies that that path has a status of "path ok". If that path has status indicating it is failed, the node looks 212 and 214 for any other compute nodes to which it might have a good path. If no such path is found, the write is declared 215 to have failed.

Once a compute node is identified to which there is a good path, a query is sent 216 to that compute node asking if it has a valid path to the storage node on which the dataset is stored. If that query fails 218 for reasons that are likely to be a result of a failed path to the node, such as a fibre channel timeout error, the node looks 212 and 214 for any other compute nodes to which it might have a good path.

If the second compute node reports that it has no "OK" path 220 to the target storage node, the node looks 212 and 214 for other compute nodes that might have a path to the target storage node. If the second compute node reports that it has an "OK" path to that target node, the node encapsulates 222 a write request into suitable frames and transmits those frames to the second compute node. The second compute node then relays that write request to the target node and relays any reply back to the compute node desirous of the write.

If the write occurs correctly 224, the compute node continues to process data. If the write is reported as having failed or timed out, the write is declared failed 215 and suitable error routines invoked.

Writes to a mirrored data set are handled similarly. When a write request occurs 300, the source node checks its path status 302 to both storage nodes having copies of the dataset. If both paths have good status 304, writes occur in the normal manner 306. If either write fails 308 for reasons, such as timeout, that could be related to a bad path, a check 310 is made to determine if both failed or if only one failed. If both write attempts failed, a both-paths failed routine is invoked (not shown).

If, when the path status was checked 302 to both storage nodes, one path was broken and the other was OK, a write is generated 312 to the storage node that can be reached. If that write fails for timeout or other reasons that could be related to a bad path, the both-paths failed routine is invoked (not shown). If that write succeeds, the source node checks 314 for an OK path to a compute node. If the compute node first tried has no valid path, the source node searches 316 and 318 for a compute node to which it has a valid path. If no compute node to which there is a valid path can be found, the mirror set is declared broken 320; such that when paths are restored an attempt will be made to re-synchronize the mirror set.

Once a valid path is found to a compute node, a query is made 322 of that compute node to determine if it has a valid path to the target storage node and to determine if that node supports surrogate writes. If that query results in a reply indicating that surrogate writes are not supported or that there is no valid path 326, or the query times out or fails for other reasons indicative of a failed path 324, the source node may continue to search 316 and 318 for another compute node that has a valid path and supports surrogate writes.

If the compute node reports that it has a valid path and supports surrogate writes, the source node encapsulates a write request into suitable frames, and transmits 328 those frames to the compute node. That node then relays the write request to the target node, and relays any reply from the target node to the source node.

Any reply from the target node is inspected to determine 330 if the write succeeded. If the write was not successful, the mirror set is reported broken 320.

It is anticipated that the present invention can be implemented in driver software of a compute node, or alternatively can be implemented in firmware of an HBA, such as a dual-port HBA.

A dual port Host Bus Adapter (HBA) (FIG. 4) typically has a port processor 400, a memory system 402 for storing frames, a DMA (Direct Memory Access) transfer system 404 and other hardware for communicating with its host (not shown), and first 406 and second 408 serializer and deserializer hardware. Each set of serializer and deserializer hardware is coupled to a network transmitter 410 and 412, and to a network receiver 414 and 416.

Figure 4:
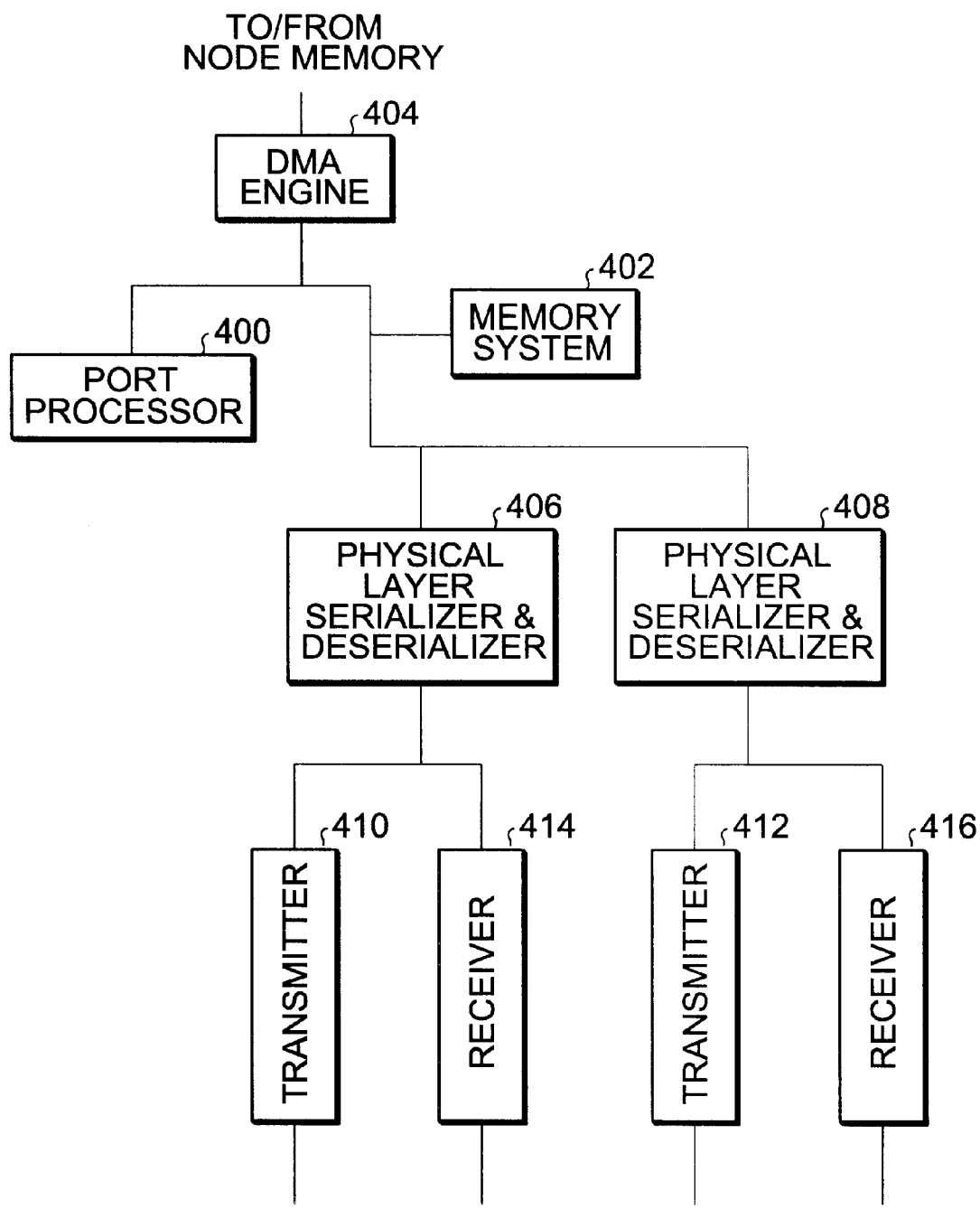
FIG. 4, a block diagram of a port capable of transmitting frames into and receiving frames from a storage area network.

A dual-port HBA like that illustrated in FIG. 4 implements the connection of second compute node 120 (FIG. 1) to links 122 and 124. A second, similar, HBA implements the connection of first compute node 100 to link 102. Each HBA is capable of maintaining a mirror set under control of firmware located in its memory system 402 and running on its port processor 400, and of implementing the method of requesting surrogate writes previously described.

Figure 3:
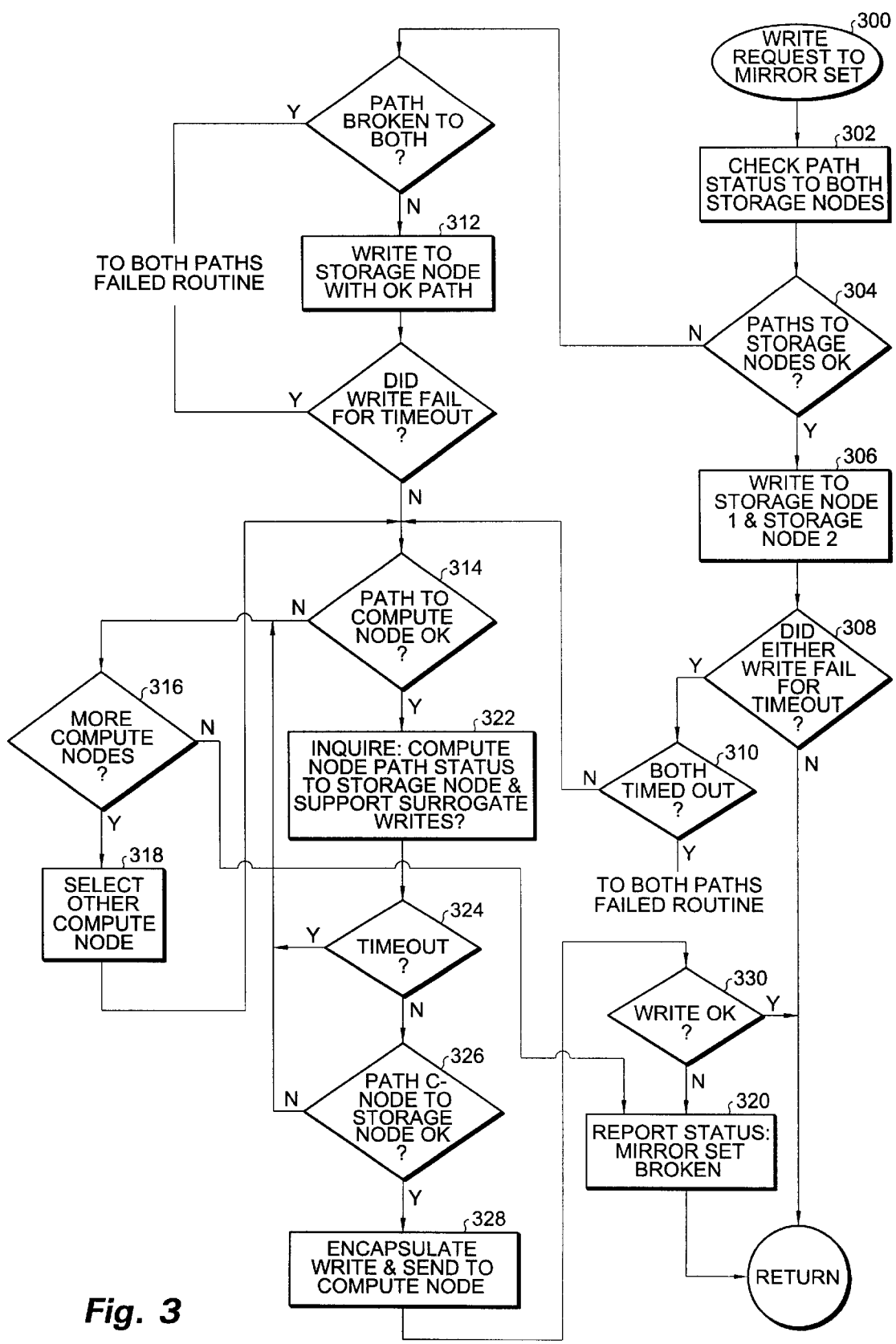
FIG. 3, a flowchart of surrogate writes maintaining a mirrored dataset.
Figure 5:
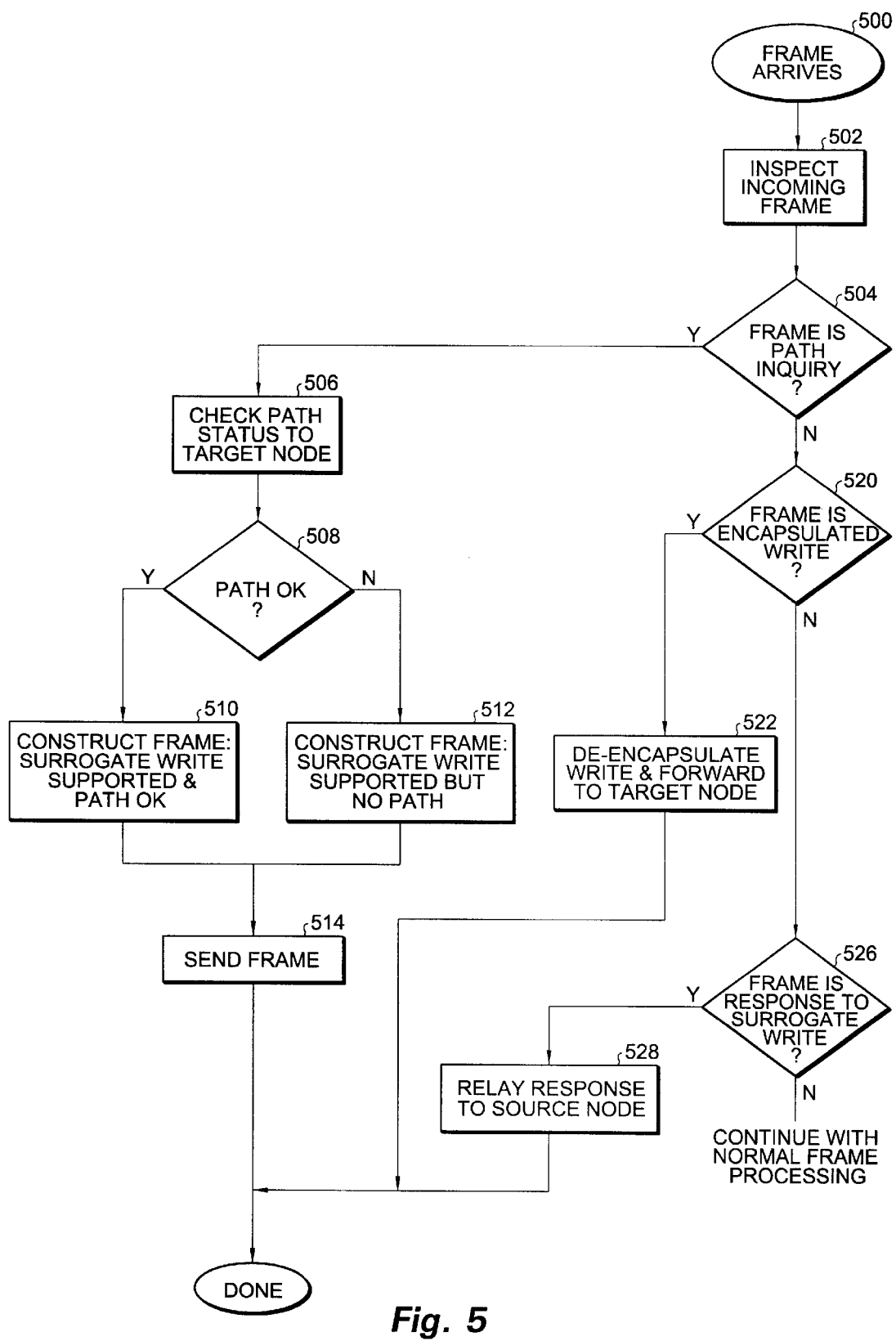
FIG. 5, a flowchart of how the invention handles data write frames encapsulated for transmission to an M_port for surrogate write operation.

Whenever the dual-port HBA receives frames 500 (FIG. 5), the frames are inspected 502 to determine the frame type. If they are path query frames 504 from a source node, as sent in steps 322 (FIG. 3) or 216 (FIG. 2) as previously described, the status of any path to the target node is determined 506, and checked 508. If a valid path exists, a reply frame is constructed 510 by the port processor 400 indicating that surrogate writes are supported and that the path is OK, otherwise a frame is constructed 512 indicating that the path does not exist or is not OK. This constructed frame is sent 514 to the source node.

If the frame was not a path query, the frame is checked 520 to see if it encapsulates a write request. If it does, the write request is de-encapsulated and forwarded 522 to the target node. If the frame does not encapsulate a write request, it is checked 526 to see if it is a response to a forwarded write request. If it is such a response, the write status is relayed 528 to the source node.

While the invention has been particularly shown and described with reference to a preferred embodiment thereof, it will be understood by those skilled in the art that various other changes in the form and details may be made without departing from the spirit and scope of the invention.

What is claimed is:

1. A host bus adapter for interconnecting a computer system to a storage area network comprising:
   hardware for transmission of frames;
   hardware for reception of frames;
   memory for storage of frames;
   a processor for processing frames, the processor coupled to the hardware for transmission of frames, the hardware for reception of frames, and the memory for storage of frames;
   wherein the processor is capable of inspecting frames for encapsulated write requests and, if encapsulated write request frames are found, de-encapsulating the write request and forwarding the write request through the hardware for transmission of frames to a target node of the write request;
   wherein the host bus adapter is capable of maintaining a mirrored dataset on at least two target nodes; and
   wherein the host bus adapter is capable of determining that it has no direct path to one of the at least two target nodes, and, when no direct path exists, is capable of requesting that another node perform a surrogate write to the one of the at least two target nodes.

2. The host bus adapter of claim 1, wherein the processor further inspects frames for responses to encapsulated write requests and, when such responses are found, forwards the responses to a source node from which the original encapsulated write request frames came.

3. The host bus adapter of claim 2, wherein the host bus adapter is capable of simultaneous connection to at least two links, having a transmitter and a receiver for coupling to each link.

4. The host bus adapter of claim 2, wherein the host bus adapter is capable of responding to a query frame, the query frame containing a request for status of any path that might exist from the host bus adapter to a specified target node.

5. A host bus adapter for interconnecting a computer system to a storage area network comprising hardware for transmission of frames;

hardware for reception of frames;

memory for storage of frames; and a processor for processing frames, the processor coupled to the hardware for transmission of frames, the hardware for reception of frames, and the memory for storage of frames;

wherein the processor is capable of inspecting frames for encapsulated write requests and, if encapsulated write request frames are found, de-encapsulating the write request and forwarding the write request through the hardware for transmission of frames to a target node of the write request;

wherein the host bus adapter is capable of maintaining a mirrored dataset on at least two target nodes including the target node of the write request; and wherein the host bus adapter is capable of scanning nodes to determine a node capable of performing a surrogate write to the target node of the write request.

6. A node for connection to a storage area network comprising:

hardware for transmission of frames;

hardware for reception of frames;

memory;

at least one processor for processing frames, the processor coupled to the hardware for transmission of frames, the hardware for reception of frames, and the memory for storage of frames;

wherein the processor is capable of inspecting frames for encapsulated write requests and, it encapsulated write request frames are found, de-encapsulating the write request and forwarding the write request through the hardware for transmission of frames to a target node of the write request;

wherein the node is capable of maintaining a mirrored dataset on at least two target nodes; and wherein the node is capable of determining that it has no direct path to one of the at least two target nodes, and, when no direct path exists, is capable of requesting that another node perform a surrogate write to the one of the at least two target nodes.

7. The node of claim 6, wherein the processor further inspects frames for responses to encapsulated write requests and, when such responses are found, forwards the responses to a source node from which the original encapsulated write request frames came.

8. The node of claim 7, wherein the node is capable of simultaneous connection to at least two links, having a transmitter and a receiver for coupling to each link.

9. The node of claim 7, wherein the node is capable of responding to a query frame, the query frame containing a request for status of any path existing from the node to a specified target node.

10. The node of claim 6, wherein the node is capable of scanning nodes of a network to determine a node capable of performing a surrogate write to the one of the at least two target nodes.

11. A computer network comprising:

a first node;

a second node;

a first target node;

a network interconnect providing communication between the first node and the second node, and providing communication between the second node and the first target node; and a second target node and the network interconnect further provides communication between the second target node and the first node; and wherein the first node is capable of maintaining a mirrored data set having a copy on the first target node and the second target node;

wherein the first node is operable to determine it has no direct path to one of the first and second target nodes, and when no direct path is determined, is operable to request the second node to perform a surrogate write to the one of the first and second target nodes;

wherein the second node is capable of inspecting incoming frames for encapsulated write requests and, if encapsulated write request frames are found, de-encapsulating a write request from the encapsulated write request frames and forwarding the write request to the first target node; and wherein the second node further is capable of inspecting frames received from the first target node for responses to previously forwarded encapsulated write requests and, when responses to previously forwarded encapsulated write requests are found, forwarding the responses to the first node.

12. The computer network of claim 11, wherein the second node is capable of responding to a path query frame with a status of a path from the second node to the first target node.

13. The computer network of claim 12, wherein the network interconnect is fibre channel compatible.

14. A method of performing writes by a first node of a storage area network to a mirrored dataset, the mirrored dataset comprising a first copy on a first storage node of the storage area network and a second copy on a second storage node of the storage area network, the storage area network having a surrogate-capable node, the method comprising the steps of:

checking a status of a first path from the first node to the first storage node and of a second path from the first node to the second storage node; if the first path has good status and the second path has bad status, then: performing a write to the first copy of the mirrored dataset over the first path;

polling the surrogate-capable node to determine whether the surrogate-capable node has a path having good status to the second storage node;

if the surrogate-capable node has a path having good status to the second storage node, encapsulating a write request to the second copy and transmitting that encapsulated write request to the surrogate-capable node; and de-encapsulating the encapsulated write request to the second copy and forwarding it from the surrogate-capable node to the second storage node.

15. The method of claim 14, further comprising the steps of:

transmitting a response to the write request to the second copy from the second storage node to the surrogate-capable node, and of forwarding the response to the write request from the surrogate-capable node to the first node.

* * * * *